United States Patent [19]

Günter et al.

[11] 4,269,866

[45] May 26, 1981

[54] COATING COMPOSITION HAVING A WATER-DILUTABLE MALEINIZED OIL BASE, PROCESS FOR THE APPLICATION AND BAKING THEREOF

[75] Inventors: Gerhard Günter, Ettlingen; Hartmut Haeufler, Aldingen, both of Fed. Rep. of Germany

[73] Assignee: Akzo N.V., Arnhem, Netherlands

[21] Appl. No.: 121,792

[22] Filed: Feb. 15, 1980

[30] Foreign Application Priority Data

Feb. 17, 1979 [NL] Netherlands ............................ 7901275

[51] Int. Cl.$^3$ .............................................. B05D 1/06
[52] U.S. Cl. ................................. 427/27; 260/18 EP; 427/375; 427/386; 427/388.4; 428/416; 428/418; 525/533; 528/112
[58] Field of Search ...................... 428/416, 418, 413; 427/27, 33, 375, 386, 388.4, 388.5; 260/18 EP; 528/112; 525/533

[56] References Cited

U.S. PATENT DOCUMENTS

| | | | |
|---|---|---|---|
| 2,847,323 | 8/1958 | Evans et al. | 428/416 |
| 3,527,720 | 9/1970 | Groff | 260/18 EP |
| 3,855,163 | 12/1974 | Bussell | 260/18 EP |
| 3,878,145 | 4/1975 | Guldenpfennig | 260/18 FP |
| 3,970,621 | 7/1976 | Kondo et al. | 260/18 EP |
| 3,974,113 | 8/1976 | Sassano et al. | 260/18 EP |
| 4,042,478 | 8/1977 | Hazan et al. | 204/181 R |

*Primary Examiner*—Shrive P. Beck
*Attorney, Agent, or Firm*—Stevens, Davis, Miller & Mosher

[57] ABSTRACT

A water-dilutable maleinized oil base coating composition is prepared by mixing from about 30 to about 95% by weight of water-dilutable maleinized oil with from about 5 to about 70% by weight of a solid particulate epoxy group- containing compound having a number average molecular weight of at least 1000 and an epoxy equivalent weight in the range of 450 to 7500, the average particle size being from about 0.5 to 35 μm. The percentages by weight of the separate binder components are based on the total weight of the two components on a solvent free basis. The novel coating composition can be used to advantage for coating any substrate and particularly for coating automobile bodies. The invention also relates to a process for applying and baking said coating composition and to substrates thus obtained.

14 Claims, No Drawings

COATING COMPOSITION HAVING A WATER-DILUTABLE MALEINIZED OIL BASE, PROCESS FOR THE APPLICATION AND BAKING THEREOF

Coating composition having a water-dilutable maleinized oil base, process for the application and baking thereof and coated substrates thus obtained.

This invention relates to a coating composition based on a water-dilutable maleinized oil. A water-dilutable maleinized oil of the type contemplated herein is a water-soluble product obtained by the addition of an $\alpha,\beta$-ethylenically unsaturated dicarboxylic acid, for instance maleic acid or fumaric acid, or an anhydride thereof, to a product which substantially consists of an ethylenically unsaturated monocarboxylic acid and an alcohol containing 2 to 6 hydroxyl groups, for instance a trivalent or tetravalent alcohol such as glycerol, trimethylol propane or pentaerythritol. Instead of or besides said alcohols other hydroxyl compounds may be used, for instance low-molecular reaction products of epichlorohydrin and bisphenol-A or copolymers from styrene and allyl alcohol.

Any suitable ethylenically unsaturated monocarboxylic acid which contains one or more carbon to carbon double bonds may be used, such as, for example oleic acid, ricinoleic acid, linoleic acid, linolenic acid, sorbic acid, eleostearic acid and licanic acid, or mixtures thereof.

Any suitable ester of an ethylenically unsaturated monocarboxylic acid and a polyhydric alcohol may be used, such as, for example, natural oils, such as linseed oil, soya bean oil, sunflower oil, safflower oil, rape seed oil, cotton seed oil, wood oil, fish oil and castor oil, or synthetic oils prepared from a fatty acid and a polyhydric alcohol such as trimethylol propane or pentaerythritol. The ethylenically unsaturated monocarboxylic acid or the polyolester thereof generally has an iodine value between 80 and 370, and preferably within the range of from 130 to 200. In the meleinized oil still other compounds may be bonded, for instance: monocarboxylic acids, such as palmitic acid, benzoic acid, p-tert-butyl benzoic acid, dicarboxylic acids, and compounds such as colophony or dimerized, oxidized or hydrogenated colophony. Further, the oil may be modified with, for instance, styrene, vinyl toluene or cyclopentadiene.

The maleinized oil contains 10 to 40 percent by weight, and preferably 18 to 25 percent by weight of the $\alpha,\beta$-ethylenically unsaturated dicarboxylic acid and the oil has an acid number in the range of 115 to 475, and preferably of 210 to 290.

To render the maleinized oil dilutable with water the oil is entirely or partly neutralized in a known manner with an alkaline compound. Suitable alkaline compounds are inorganic hydroxides, such as ammonia or lithium hyroxide, or primary, secondary or tertiary amines, for instance, monoethylamine, monobutylamine, dimethylamine, diethylamine, triethylamine, diethanolamine or triethanolamine.

The maleinized oil may be prepared in a known manner, for instance by reaction of the $\alpha,\beta$-ethylenically unsaturated dicarboxylic acid with the ethylenically unsaturated monocarboxylic acid or the polyol ester thereof, at a temperature generally within the range of from 150° to 260° C., optionally in the presence of a catalyst.

The afore-described water-dilutable maleinized oils find application as film-forming constituent in coating compositions such as varnishes and paints. Such coating compositions, however, have a number of disadvantages. Particularly at a solids content of more than 35%, only water being used as a solvent for the maleinized oil, the viscosity is very high. Consequently, in order that these systems may be satisfactorily workable, they must be thinned to such a degree that the solids content becomes too low, so that a sufficiently thick coating can be obtained only by repeatedly applying the coating composition to the substrate. Such a procedure, however, is very uneconomical. Up till now it has been tried to somewhat remedy this disadvantage by adding an organic solvent to the coating composition. During their handling and drying, however, the compositions thus obtained present drawbacks as far as safety and environmental hygiene are concerned.

An object of the invention is to provide a coating composition which is suitable for industrial use, and more particularly for application in the automobile industry, for instance as a coating of motor car bodies, and does not show the above-mentioned drawbacks. The coating composition is little viscous in spite of its high solids content, dries quickly and does not give any air pollution as a result of organic solvents being absent in the composition since there is no longer any need for them and because they generally may tend to give rise to solvating or swelling of the epoxy resin particles and accordingly cause agglomeration thereof. Besides, the coating composition is easy to apply and makes it possible to obtain smooth surfaces without irregularities. Another advantage is that dried up rests of the coating composition can for a long time, for instance a few days, still be washed off with water.

The coating composition according to the invention is characterized in that it contains a binder made up of 30–95% by weight of the water-dilutable maleinized oil and 5–70% by weight of a solid particulate epoxy group-containing compound having a number average molecular weight of at least 1000 and an epoxy equivalent weight in the range of 450 to 7500, the percentages by weight being calculated on the sum of the two solvent-free components and said solid particulate epoxy group-containing resin having an average particle size of about 0,5 to 35 μm. It is preferred that the binder should be made up of 45–75% by weight of the maleinized oil and 25–55% by weight of the solid epoxy-group containing compound, the percentages by weight being based on the sum of the two solvent-free components. More preferably, the binder is made up of 52–75% by weight of the maleinized oil and 25–48% by weight of the solid epoxy group-containing compound, the percentages by weight being based on the two solvent-free components.

U.S. Pat. No. 4,042,478 discloses an aqueous electrocoating composition containing as filmforming constituents:
(a) a reaction product of maleinized oil and the esterification product of an epoxy hydroxy polyether resin and a drying oil fatty acid, and
(b) a water-dispersible cross-linking agent. Published Japanese Patent Application 64-25281 describes an aqueous solution of maleinized oil and a liquid epoxy resin having a molecular weight of less than 1000, the weight ratio of the epoxy resin to the maleinized oil being in the range of 95:5 to 50:50. To promote the solubility of the epoxy resin in the aqueous system it is preferred that an organic solvent, such as a monoalcohol, for instance ethanol, or a glycol derivative, for instance ethylene glycol monoethyl ether, should be added. From published Japanese Patent Application 77-125535 it is known that as colourant coloured powders of a thermoplastic synthetic resin and having a particle size of 50 to 1200 μm are added to an aqueous solution of maleinized oil to obtain a multicoloured pattern. Representative examples of the powdered thermoplastic resin are alkyd resins and (co)polymers of vinyl chloride. If the resulting coating composition is dried at elevated temperature, then this temperature must be below the melting point of the powdered thermoplastic resin used as colourant. It should be added that published Japanese Patent Application 64-25283 reveals a coating composition which is obtained by dispersing a powdered thermoplastic resin, such as polyacrylate, polyvinyl chloride, polyamide, polyethylene or polystyrene in an aqueous solution of a specific thermosetting resin which upon heating becomes insoluble in water. The powdered thermoplastic resin, which must have a particle size of 44-150 μm, will melt upon the applied layer of the coating composition being heated, the resin particles adhering to each other to form a continuous and uniform coating layer. The specific, water-soluble resin then serves as a dispersing medium for the powdered thermoplastic resin. Representative examples of the dispersing medium are copolymers of maleic anhydride and one or more alkyl acrylates, coconut-modified polyester resins and melamine-formaldehyde resins.

The solid epoxy group-containing compound generally contains at least 1, but by preference 2 or more epoxy groups per molecule. For the sake of brevity the epoxy-group containing compound will be referred to hereinafter as epoxy resin. As examples of suitable solid epoxy resins may be mentioned: glycidyl-groups containing resins such as polyacryl resins, polyesters, polyethers or polyurethanes which all contain one or more glycidyl groups per molecule. It is preferred that the epoxy resin should be a compound of the following general formula:

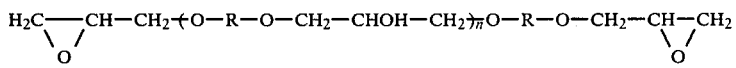

wherein R represents an aliphatic, cycloaliphatic or aromatic group and n is a number within the range of from 0 to 150, preferably between 0 and 60. As examples of such epoxy resins may be mentioned the glycidyl ethers of ethylene glycol, diethylene glycol, triethylene glycol, 1,2-propylene glycol, 1,3-propylene glycol, 1,5-pentane diol, bis-(4-hydroxycyclohexyl)-2,2-propane, 4,4'-dihydroxybenzophenone, bis-(4-hydroxyphenyl)-methane, bis-(4-hydroxyphenyl)-1,1-ethane, bis-(4-hydroxyphenyl)-1,1-isobutane and 1,5-dihydroxynaphthalene. Optionally, use may be made of polyglycidyl ethers of compounds such as glycerol or 1,2,6-hexane triol. More particularly, preference is given to the use of a diglycidyl ether based on bis-(4-hydroxyphenyl)-2,2-propane. Also mixtures of epoxy resins may be employed. The epoxy equivalent weight of the epoxy resin(s) is by preference 600-2000, more particularly 800-1500. Preferably, the solid particulate epoxy resin has a number average molecular weight in the range of 1000 to 15000. The solid particulate epoxy resin has a melting point which is generally between about 40° C. and the baking temperature, which is usually at about 150° to 180° C.; the melting point is preferably in the range of 70° to 130° C. The average particle size of the solid particulate epoxy resin is in the range of about 0,5 to 35 μm, and is preferably in the range of 2 to 25 μm.

The water-dilutable maleinized oil and the solid epoxy resin may be combined in a simple manner, for instance by intermixing the solid epoxy resin and the maleinized oil and subsequently grinding the epoxy resin in the presence of the maleinized oil. Alternatively, however, the epoxy resin may be pulverized before it is mixed with the oil. Of advantage is that with either method of mixing no surface active compounds or protective colloids need be added.

The coating composition may contain the usual additives, for instance: pigments, fillers and levelling agents. If desired, also additional cross-linking agents, for instance melamine resins and melamine urea resins, may be used. The coating composition may optionally also contain a liquid or solid cross-linking agent for the solid particulate epoxy resin, such as:

(a) a polyanhydride: for instance: pyromellitic anhydride, copolymers of maleic anhydride and styrene, ethylene and/or acrylate compounds, and adducts of maleic anhydride and ethylenically unsaturated compounds such as unsaturated fatty acids and polybutadiene compounds;

(b) polyamino amides having an amino number of 80-400;

(c) polyamines; for instance: ethylene diamine, diethylene triamine, triethylene tetramine, isophoron diamine and xylene diamine;

(d) anhydrides; for instance: phthalic anhydride, hexahydrophthalic anhydride and methyl hexahydrophthalic anhydride;

(e) polycarboxylic compounds; for instance: phthalic acid, trimellitic acid, copolymers of (meth)acrylic acid and acrylate compounds and/or styrene and polyester resins having an acid number generally of 50-430, but preferably of 100-200;

(f) blocked polyisocyanates; for instance: hexamethylene diisocyanate blocked with caprolactam or with a methylethyl ketoxime; and (g) compounds such as dicyandiamide. The cross-linking agents referred to above are generally known (see for instance Lee and Neville, Handbook of Epoxy Resins, McGraw Hill, New York) and need not be further described here. The cross-linking agent or a mixture thereof is usually employed in an amount of about 0,1 to about 5% by weight, calculated on the solid epoxy resin. Optionally, the cross-linking agent may previously be mixed with the epoxy resin or be added to the aqueous composition or to some component thereof.

The coating composition may be applied to a substrate in any convenient way; for instance by roller coating, spraying, brushing, sprinkling, flow coating or dipping. It is preferred, however, that the coating composition be applied to the substrate by electrostatic spraying. The coating composition applied is baked and crosslinked at a temperature which is above the melting point of the solid epoxy resin. The temperatures applied are in the range of 80° to 200° C., and preferably between 130° and 170° C. The substrate may be of a pretreated or non-pretreated metal or synthetic material. As examples of suitable metals may be mentioned iron, steel, zinc and aluminium.

The properties of the baked coating composition according to the invention at least compare with those of the usual baking enamels.

that an aqueous 40% solution having a pH of 7,5 was obtained.

TABLE 1

| Compounds | Examples |||||||||||||||
|---|---|---|---|---|---|---|---|---|---|---|---|---|---|---|---|
| | A | B | C | D | E | F | G | H | I | J | K | L | M | N | O |
| | parts by weight |||||||||||||||
| Maleic anhydride | 19 | 25 | 28 | 16 | 30 | 24 | 25 | 20 | 17 | 22 | 19 | 18 | 23 | 18 | 25 |
| Natural oils: |||||||||||||||||
| Linseed Oil | 81 | | | | | | | | | | | | | | |
| Soya bean oil | | 75 | | | | | | | | | | | | | |
| Wood Oil | | | 72 | | | | | | | | | | | | |
| Safflower oil | | | | 84 | | | | | | | | | | | |
| Synthetic oils prepared from: | | | | | 70 | 76 | 75 | 80 | 83 | 78 | 81 | 82 | 77 | 82 | 75 |
| | Amounts in moles |||||||||||||||
| Linseed fatty acid | | | | | 4 | 2 | | 2 | | 2 | 1 | 1 | | | 3 |
| Tall fatty acid | | | | | | 1 | | 3 | | | 1 | | 2 | | |
| Safflower fatty acid | | | | | | | 2 | | | | | 2 | | 2 | |
| Castor fatty acid | | | | | | | | | | | 1 | | 2 | | |
| Oleic acid | | | | | | | 1 | | 1 | | | | | | |
| Isononanoic acid | | | | | | | | | | | 1 | | | | |
| Benzoic acid | | | | | | | | | 1 | | | | | 1 | |
| Colophony | | | | | | | | | | | | | | | 1 |
| Pentaerythritol | | | | | 1 | | | | 1 | | 1 | 1 | | | 1 |
| Glycerol | | | | | | | | | | 1 | | | 1 | | |
| Trimethylol propane | | | | | | 1 | 1 | | | | 1 | | | | |
| Neopentyl glycol | | | | | | | | 1 | | | | | | | |

EXAMPLES A–O

For the preparation of the maleinized oil first of all the synthetic oils to be used were made, which was done by esterification of the various compounds mentioned in Table 1 in the amounts given in it (expressed in moles). The esterification was carried out in a reactor fitted with a stirrer, a thermometer, a water outlet, a cooler and an inlet tube for an inert gas such as nitrogen or helium. All starting materials were charged into the reactor in the order indicated, followed by adding 4% by weight of xylene. The reaction mixture was melted and heated to boiling temperature (230°–240° C.) with stirring, and passing through a stream of inert gas, and in the presence of an esterification catalyst (tin octoate). The water evolved during the esterification was removed azeotropically by the xylene, the xylene being fed back into the reactor. During the esterification, which may last up to 24 hours, the reaction process was followed while determining the acid number. The reaction was allowed to proceed until the acid number was below 10 and remained at this value upon continued heating of the reaction mixture to 230°–240° C. Then the xylene was removed in vacuo.

Next, the resulting synthetic oils or the natural oils were reacted with maleic anhydride in the amount given in Table 1 (parts by weight). The reaction was carried out in a reactor equipped with a stirrer, a thermometer and a reflux condenser. The starting materials were brought into the reactor in the order indicated, after which the reaction mixture was kept at a temperature of 195°–220° C. After about 3 hours the reaction mixture no longer contained any free maleic anhydride and the reaction was stopped. The maleinized oil was cooled to a temperature below 95° C. and subsequently mixed with water and triethylamine in amounts such

EXAMPLE I 49 parts by weight of each of the 40% aqueous solutions of the maleinized oils obtained in accordance with the Examples A–O were mixed with 11 parts by weight of a solid epoxy resin consisting of a diglycidyl ether of bis-(4-hydroxyphenyl)-2,2-propane having an epoxy equivalent weight of 900–1000 and a melting point of 96°–104° C. To this mixture there were subsequently added 41 parts by weight of titanium dioxide as pigment, after which the mixture was ground to a particle size of 25 μm. By adding 5–7% by weight of water the viscosity was set to 18 seconds (measured in conformity with DIN 53211).

Of the resulting coating composition according to the invention 1 cross-coat was applied to flat sheet metal to a thickness of 25–200 μm and baked for 30 minutes at 170° C. The baked coatings showed indentation values of 1,3–2,5 (measured in accordance with DIN 53156), hardness values of 100–150 (measured in accordance with DIN 53157), gloss values of 30–50% (measured in accordance with Gardner 60°), and elongation values of 5–12 mm (measured in conformity with ASTM D522-60). The coatings obtained show good to very good sanding properties both in the wet and in the dry state.

For comparison the experiments were repeated, but in such a way that the solid particulate epoxy resin was omitted. After the coating layers had been cured, they could be dissolved by washing with alkaline water. The baked coatings were very soft and not resistant to organic solvents. It can be concluded that maleinized oil cannot be considered to be a thermosetting product. For, upon baking it would form a hard, insoluble and solvent resistant coating layer which cannot be dissolved by washing with alkaline water.

EXAMPLES II–IV

A 40% aqueous solution of a maleinized oil obtained in accordance with one of the Examples H, D and L was mixed with a diglycidyl ether of bis-(4-hydroxyphenyl)-2,2-propane respectively having an epoxy equivalent weight of 450–500 and a melting point of 64°-74° C. (Example II), an equivalent weight of 1700-2000 and a melting point of 125°-132° C. (Example III) and an equivalent weight of 2500-4000 and a melting point of 140°-154° C. (Example IV). The composition of the maleinized oil is designated in Table 2 by the letter of the Example in which the oil was prepared. The amounts of the two components mentioned and those of the water and titanium dioxide still added are also mentioned in Table 2. Subsequently, the mixture was ground to a particle size of less than 35 μm. Finally, dimethylethanolamine was added to bring the pH of the coating composition to a value of 7.8. The coating composition was tested in exactly the same way as in the preceding examples. The indentation values, hardness values, gloss values and elongation values were found to be 1.2-2.5, 90-160, 30-50%, and 5-16 mm respectively. The coatings obtained show good to very good sanding properties both in the wet and in the dry state.

TABLE 2

| Compounds | Examples | | |
|---|---|---|---|
| | II | III | IV |
| Maleinized oil | R-20 | N-20 | V-10 |
| Solid epoxy resin | 20 | 40 | 50 |
| Water | 8 | 8 | 15 |
| Titanium dioxide | 25 | 15 | 10 |

What is claimed is:

1. A coating composition based on a water-dilutable maleinized oil, characterized in that it contains a binder made up of 30-95% by weight of the water-dilutable maleinized oil and 5-70% by weight of a solid particulate epoxy group-containing compound having a number average molecular weight of at least 1000 and an epoxy equivalent weight in the range of 450 to 7500, the percentages by weight being calculated on the sum of the two solvent-free components, and said solid particulate epoxy group-containing compound having an average particle size of about 0,5 to 35 μm.

2. The coating composition of claim 1, wherein the binder is made up of 45-75% by weight of the maleinized oil and 25-55% by weight of the solid particulate epoxy group-containing compound, the percentages by weight being based on the sum of the two solvent-free components.

3. The coating composition of claim 1, wherein the binder is made up of 52-75% by weight of the maleinized oil and 25-48% by weight of the solid particulate epoxy group-containing compound, the percentages by weight being based on the sum of the two solvent-free components.

4. The coating composition of claim 1, wherein the solid particulate epoxy group-containing compound has an epoxy equivalent weight in the range of 600 to 2000.

5. The coating composition of claim 1, wherein the solid particulate epoxy group-containing compound has an epoxy equivalent weight in the range of 800 to 1500.

6. The coating composition of claim 1, wherein the solid particulate epoxy group-containing compound has the general formula:

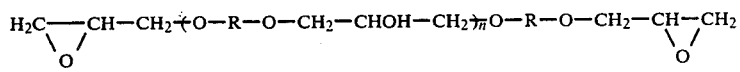

wherein R is an aliphatic, cycloaliphatic or aromatic group and n is a number within the range of from 0 to 150.

7. The coating composition of claim 1, wherein the solid particulate epoxy group-containing compound is a diglycidyl ether based on bis-(4-hydroxyphenyl)-2,2-propane.

8. The coating composition of claim 1, wherein the average particle size of the solid particulate epoxy group-containing compound is in the range of 2 to 25 μm.

9. The coating composition of claim 1, wherein the solid particulate epoxy group-containing compound has a melting point in the range of 40° and a baking temperature of 150° to 180° C.

10. The coating composition of claim 1, wherein the solid particulate epoxy group-containing compound has a melting point in the range of 70° to 130° C.

11. The coating composition of claim 1, wherein the solid particulate epoxy group-containing compound has a number average molecular weight in the range of 1000 to 15000.

12. A process for applying an aqueous coating composition to a substrate which comprises applying the coating composition of claim 1 to the substrate by electrostatic spraying.

13. A process for coating a substrate which comprises applying the composition of claim 1 to the substrate and baking the resulting coating at a temperature above the melting point of the solid particulate epoxy group-containing compound.

14. The process of claim 13, wherein the resulting coating is baked at a temperature of about 150° to 180° C.